United States Patent [19]
Valles

[11] 3,965,756
[45] June 29, 1976

[54] MULTI-SPEED AND LEVERAGE MOTOR

[76] Inventor: Alfredo E. Valles, 610 Salem Ave., Apt. A-3, Elizabeth, N.J. 07207

[22] Filed: Mar. 14, 1975

[21] Appl. No.: 558,250

[52] U.S. Cl. .............................. 74/22 R; 60/484; 60/486; 290/1 R
[51] Int. Cl.² .................................... F16H 25/08
[58] Field of Search ............. 74/11, 22 R, 190, 720; 60/484, 486

[56] References Cited
UNITED STATES PATENTS

| | | | |
|---|---|---|---|
| 985,012 | 2/1911 | Dargin | 74/24 |
| 1,139,520 | 5/1915 | Hastings | 51/26 |
| 2,545,008 | 3/1951 | Senglet | 74/325 |
| 2,557,933 | 6/1951 | Beaman et al. | 60/629 |
| 2,828,638 | 4/1958 | Rullo | 74/190 |

Primary Examiner—Edgar W. Geoghegan

[57] ABSTRACT

In a preferred embodiment, there is provided in series with one-another a plurality of the basic motor unit of the present invention, the basic unit including one or more electric motors in parallel for driving a hydraulic compressor feeding a piston cylinder provided with a piston shaft extending axially along the longitudinal axis of the piston cylinder for reciprocatable motion of the piston shaft which at the distal end thereof is connected to a rotary crank and by the reciprocatable motion revolves the crank to impart rotary motion to the gears of a gear box drivable of the gearbox output rotary shaft having an appropriate clutch and a take-off pulley driven by the rotary shaft, and further driving a next-occurring hydraulic compressor of a next basic motor unit in the series.

10 Claims, 5 Drawing Figures

MULTI-SPEED AND LEVERAGE MOTOR

The present invention relates to a mechanism for utilizing rotary power of one or more small electric motors to obtain a choice of a variety of higher or lower magnitudes of power and/or speed, and power take-offs from the mechanism thereof.

BACKGROUND TO THE INVENTION

Prior to the present invention, there does not appear to have existed any comparable machine to that of the present invention, the closest choices heretofore having required use of extensive large bulky gear mechanisms in order to convert low power high-speed rotary motion of shafts of small motors such as preferably electric motors into a high magnitude of power and/or varying degrees of speed, such cumbersome and large bulky machines being not only very expensive to manufacture and also expensive to maintain, but requiring excessive amounts of space and accordingly being necessarily also high priced. There is the additional disadvantage that through a large number of intermeshing gears of the prior art, there was lost a major amount of energy by friction and lost motion.

SUMMARY OF THE INVENTION

Accordingly, objects of the present invention are to overcome one or more difficulties of the types described above, as well as other novel advantages.

In particular, another object is to provide a simple structured mechanism of different types of leverage devices to obtain a ready predetermined degree of take-off power and speed of a rotary type, together with additional advantages that may be gained by a series of such devices, consecutively in series with one-another.

Another object of the present invention is to obtain a novel mechanism of obtaining rotary motion from a reciprocatable piston.

Other objects become apparent from the preceding and following disclosure.

One or more objects of the present invention are obtained by the invention as defined herein.

Broadly the invention may be defined as a multi-speed and leverage motor combination including a first motor driving a rotary shaft thereof with the rotary shaft drivably connected to a fluid compressor, preferably hydraulic, which drives a reciprocatable piston rod by means of a preferably hydraulic piston operating in a cylinder having limit switches mounted thereon for effecting timely reversal of direction of drive of the reciprocating hydraulic piston. The hydraulic piston is connected for imparting rotary motion to a crank shaft driving gears obtaining predetermined ratios of power and speed. The gear box output rotary drive shaft is connected through a clutch preferably to a take-off wheel and shaft which take-off shaft is further engageable preferably through another clutch, to preferably another hydraulic compressor, as the beginning compressor of a second substantially identical motor unit as that just described.

In preferred embodiments, a plurality of two or more of the motor units are in series with one-another consecutively, making possible a plurality of accessible power take-offs at varying magnitudes of power and/or speed, as predetermined by the gear ratio of the particular gear boxes thereof. At least one of the gear box output drive shafts is drivable of a generator directly or indirectly, for the recharging of a battery providing at least a part of the necessary electrical power for driving the electric motor(s) driving the first compressor.

In one particular preferred embodiment, the reciprocatable rod reciprocatable along the longitudinal axis thereof, includes as a part of the greater combination thereof, connected to the crank shaft, a plurality of springs for facilitating the continued rotary movement of the crank shaft at the points of reversal of direction of the reciprocatable piston. In particular, the springs are so positioned as to provide one of the springs with tension while the other spring is in a relaxed state at one of the points of minimal torque by the reciprocatable piston, and exactly the opposite situation at an opposite location of minimal torque for the piston. In another alternate embodiment, there are provided a plurality of pistons connected to a single crank shaft with the plurality of pistons being reciprocatable in planes perpendicular to each other typically, in order that one of the pistons may assure continued rotary movement of the crank shaft past a point of minimal torque of the other piston, and visa versa.

THE FIGURES

FIG. 1, FIG. 2, FIG. 2A, FIG. 2B, and FIG. 2C all represent diagrammatic illustrations of a mechanical combination and variations thereof, of the present invention. In particular, FIG. 1 illustrates a diagrammatic elevation plan view of a combination of a series of the motor units of the invention, serially one behind the other consecutively.

FIG. 2 illustrates a preferred embodiment of the secondary drive means for effecting the rotary movement of the crank structure beyond minimal torque positions, utilizing a pivoted piston cylinder, and FIG. 2B similarly utilizing a pivoted piston cylinder but in the illustrated alternate embodiment utilizing a plurality of pivoted piston cylinders for assuring the continuous rotary movement of the crank shaft. In contrast, FIG. 2A similar to FIG. 2 in the arrangement of opposing springs connected to the crank shaft, utilizes a non-pivotable cylinder with a piston having a transversely extending slot structure, and the embodiment of FIG. 2C having two such stationary piston cylinders with their respective piston shafts with each piston shaft having transversly extending slot structure defining a transversly extending slot thereof for effecting continuous rotary momement of the crank shaft. Each of FIGS. 2, 2A, 2B, and 2C represent views taken typically along any of lines 2—2 of FIG. 1. FIGS. 1 and 2 represent one preferred embodiment.

DETAILED DESCRIPTION OF THE INVENTION

Figure 1:
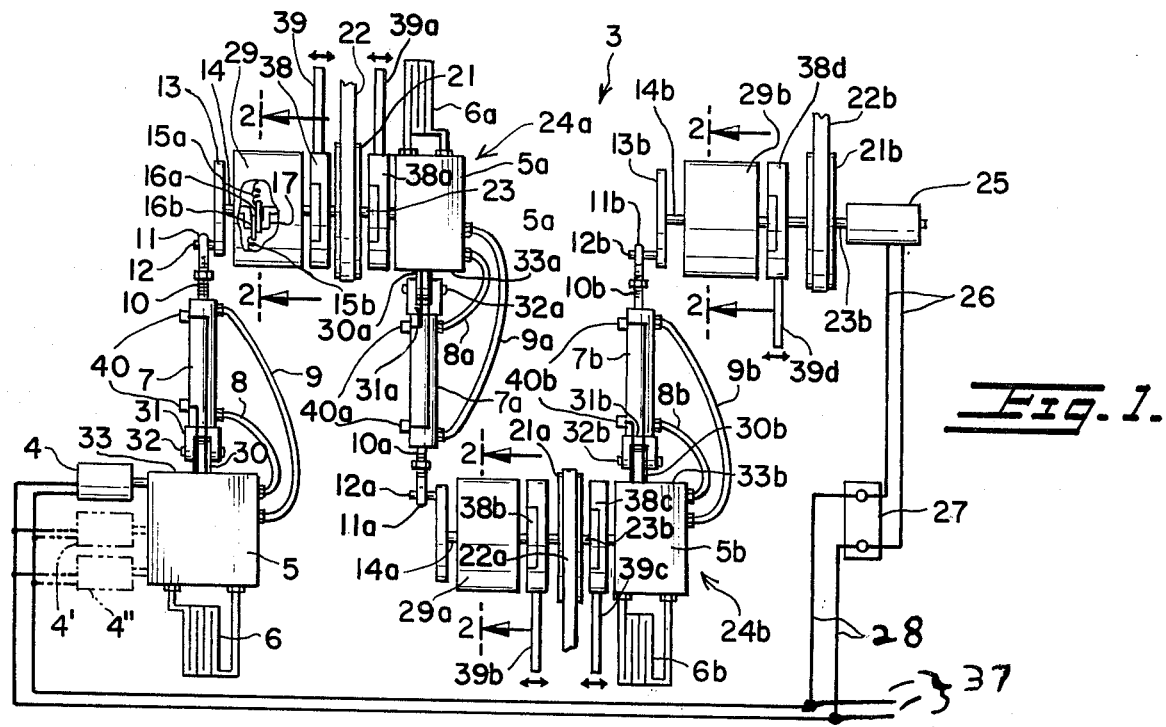
Figure 2:
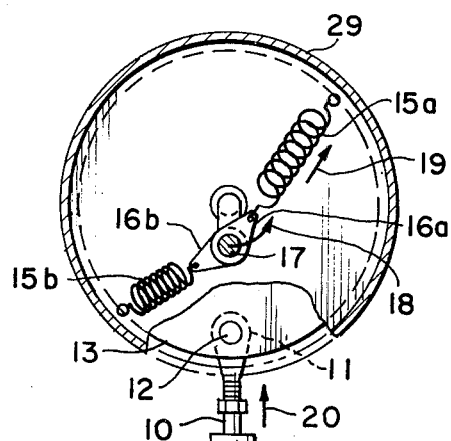

In greater detail, FIG. 1 illustrates a preferred combination 3 of a plurality of serially arranged motor units of the present invention. The first motor unit, for example, includes a motor 4 which is an electric motor in this illustrated embodiment, with a rotary drive shaft extending therefrom, to and driving the hydraulic compressor and reversing-valves unit 5 with its radiator structure 6 and the pivotably mounted hydraulic cylinder 7 mounted thereon with hydraulic fluid feed lines 8 and 9 for conducting fluid to bring about reciprocatable motion of a piston 10 by conventional compressor alternate fluid-direction mechanism, the piston 10 having a distal end 11 thereof mounted on a pin 12 of a crank wheel 13 mounted rotatably on a shaft 14 having secondary spring drive elements as spring element 15a mounted between the crank attaching structure 16a and mounting structure such as structure 29 as illustrated in FIGS. 1 and 2; and similarly the other spring 15b is mounted between the crank attaching element 16b and the mounting structure 29. Accordingly, the crank 17 is caused to rotate in a revolving motion as driven jointly by the reciprocated piston 10 and the spring actions of the springs 15a and 15b. The rotary crank 17 drives gearing of the gear box 29 to which the springs are attached, and there being a gear box output drive shaft leading to a clutch plate 38 connected operatively with a clutch lever 39 for clutch engaging and disengaging lever action of a power take-off wheel 21 and belt 22 mounted thereon. A shaft 23 connected to wheel 21 drives the hydraulic compressor of the next unit. The reciprocatable action of the piston 10 is brought about by the alternate flowing of the hydraulic fluid in the lines 8 and 9 as controlled by conventional valve elements within the compressor and valve unit 5 as controlled by the limit switches 40 mounted on opposite ends of the cylinder 7, which is mounted by the female element 31 and pin 32 on the male element 30 secured on base 33 of the hydraulic compressor unit 5. The second compressor unit 24a corresponds, for the next serially-occuring motor unit, to the initial compressor unit 5. The generator 25 is driven by a suitable rotary shaft and leads 26 therefrom recharge the battery 27 which has output leads 28 leading to the electric motor 4 and any other motors such as 4' and 4'' in parallel therewith all connected for alternate and/or concurrent driving of the hydraulic compressor 5, depending upon the magnitude of power desired and speed of effecting the same.

The leads 28 are further interconnected with external power source leads 37. The hydraulic pressure compressor unit 24b in like manner, corresponds to hydraulic compressor unit 24a which corresponds to the hydraulic compressor unit 5.

Figure 2A:
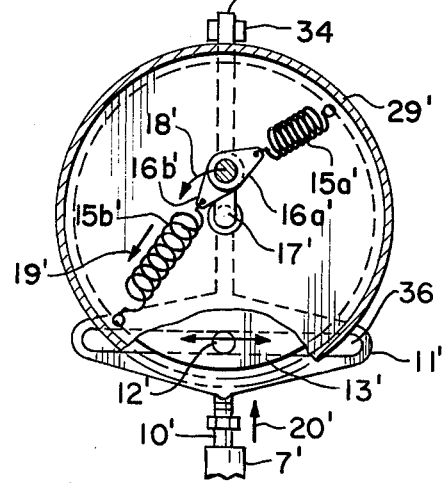
Figure 2B:
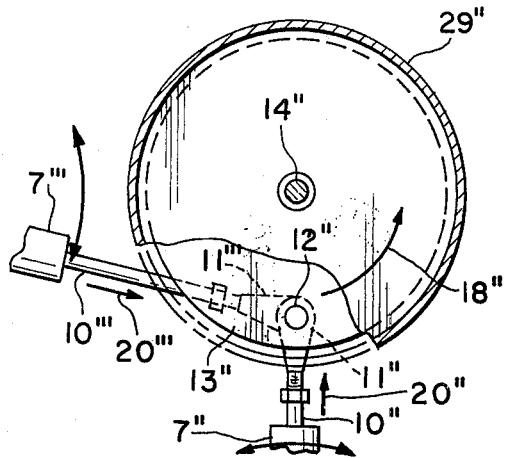
Figure 2C:
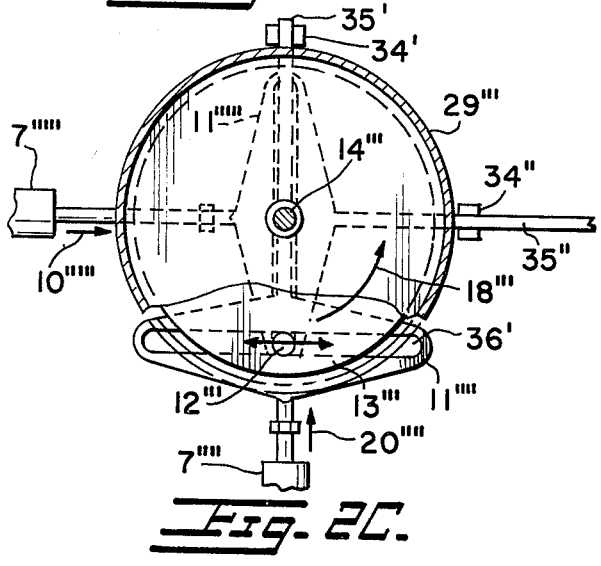

FIG. 2, in greater detail, illustrates a pivotably mounted piston cylinder 7 for reciprocation of the piston 10 thereof as illustrated in the present position moving in direction 20 while the crank is moving in direction 18 beyond the present point of minimum torque thereon, the direction 18 movement beyond this point being assured by virtue of the connecting element 16a having the extended spring 15a biasing and moving the element 16a in direction 19. During this phase of the rotary movement, the spring 15b is connected to the element 16b and is in a relaxed state. For the alternate embodiment of FIG. 2A, the reverse position is shown for the springs and the position of the crank as compared to the embodiment of FIG. 2, the FIG. 2A embodiment also illustrating a different type of piston having a slot structure 11' defining a slot 36 with the piston 10' mounted reciprocatably within the slot 36 as the piston moves in the indicated direction from a fixed position, piston cylinder 7' with the springs 15a' and 15b' causing rotation beyond dead-center points of the pin 12'. In like manner, the embodiment of FIG. 2C illustrates two fixed position cylinders, 7'''' and 7''''' for effecting the complete rotary motion of the crank, the shaft 35' being shown at a point of maximum effective torque, and shaft 35' being shown at a point of minimum torque, in causing a revolving motion. FIG. 2B similarly effects the rotary motion by virtue of two separate piston cylinders 7'' and 7''' with their respective pistons, these piston cylinders being pivotably mounted as is illustrated in the embodiment of FIG. 1.

Other structures such as the gear box mounting structure 29'' of FIG. 2B and the gear box mounting structure 29''' of FIG. 2C correspond to the analogous illustrated structure 29 of FIG. 1, for these differing embodiments. Similarly, for FIG. 2A, there is the gear box mounting structure 29'. The mechanism of the hydraulic compressors and of the limit switches and of the gears and mechanisms thereof for changing ratios in mechanical advantage and speed and of the valve elements of the hydraulic compressor units are not illustrated because such are merely conventional and well known prior art hereby incorporated by reference hereinto. Numbers not specifically discussed corresponding to similar numbers identified, identify corresponding type elements.

It is within the scope of the present invention to make variations and modifications and substitution of equivalents as would be within ordinary skill.

I claim:

1. A multi-speed and leverage motor device comprising in combination: a first motor means for imparting a rotary motion to drive a shaft; a first rotary drive shaft drivable rotatably by operative connection to said first motor means; a first fluid compressor means for providing fluid pressure, including a first fluid piston reciprocatable in alternating to and fro action directions in a cylinder extending along its longitudinal axis, the fluid compressor means including valve elements adapted to effect fluid reciprocatable motion of the first fluid piston in said directions, the first fluid compressor means being operatively connected for the driving and operation thereof by said first rotary drive shaft; a first crank structure; and a first gear ratio means for providing predetermined mechanical and speed advantages having a second drive shaft extending therefrom and drivable thereby, the crank structure being drivable of and connected to the gear ratio means for providing predetermined mechanical and speed advantages and having a second drive shaft extending therefrom and drivable thereby, the crank structure being drivable of and connected to the gear ratio means at one end of the crank structure and connected to be driven at an opposite end of the crank structure by the first fluid piston.

2. A multi-speed and leverage motor device of claim 1, including first power take-off means for drivable engagement of the second drive shaft.

3. A multi-speed and leverage motor device of claim 2, in which the second drive shaft is drivably connected to a second fluid compressor means for providing fluid pressure, the second fluid compressor means including second valve elements, the second valve elements being adapted to control fluid pressure so as to reciprocate a second fluid piston in a cylinder along its longitudinal axis, and second crank structure connected to and drivable by the second fluid piston, second gear ratio means for providing mechanical and speed advantages with a third drivable rotary shaft driven thereby having the second gear ratio means for providing mechanical and speed advantages with a third drivable rotary shaft driven thereby having the second gear ratio means connected to be driven by the second crank structure, the first and second fluid compressor means being hydraulic compressor means.

4. A multi-speed and leverage motor device of claim 3, including secondary drive means for effecting continuous rotary movement of the first and second crank structures beyond minimal torque positions of drive by the first and second fluid pistons, respectively.

5. A multi-speed and leverage motor device of claim 1, including secondary drive means for effecting continuous rotary movement of the first crank structure beyond minimal torque positions of drive by the first fluid piston.

6. A multi-speed and leverage motor device of claim 5, in which the secondary drive means comprises spring elements mounted in first and second positions respectively at one end of each spring respectively, to support structure and at a remaining end of each spring respectively, to the first crank structure at locations such that at one rotary point of minimal driving torque on the first crank structure by the first fluid piston one of the spring elements is operative to cause continued advancing rotary movement of the first crank element and at an opposite rotary location of the first crank structure the other of the spring elements is operative to continue rotary forward movement of the first crank element.

7. A multi-speed and leverage motor device of claim 6, and a piston cylinder adapted to be drivable of the first fluid piston reciprocatably and mounted pivotally such that the piston cylinder and the first fluid piston pivot during the reciprocatable driving action of the first fluid piston in the driving of the first crank structure.

8. A multi-speed and leverage motor device of claim 1, and a piston cylinder adapted to be drivable of the first fluid piston reciprocatably and mounted pivotally such that the piston cylinder and the first fluid piston pivot during the reciprocatable driving action of the first fluid piston in the driving of the first crank structure.

9. A multi-speed and leverage motor device of claim 1, in which the first fluid piston includes slot structure defining a slot extending in a direction transverse to a longitudinal axis of a portion of the first fluid piston, and the first crank structure being mounted slidably within the slot adapted to move to and fro slidably therein during rotary movement of the first crank structure.

10. A multi-speed and leverage motor device of claim 1, including a plurality of said first motor means all being connected for driving the first hydraulic compressor means.

* * * * *